United States Patent [19]

Holtey et al.

[11] 4,419,727

[45] Dec. 6, 1983

[54] HARDWARE FOR EXTENDING MICROPROCESSOR ADDRESSING CAPABILITY

[75] Inventors: Thomas O. Holtey, Newton; Robert C. Miller, Braintree, both of Mass.

[73] Assignee: Honeywell Information Systems Inc., Waltham, Mass.

[21] Appl. No.: 269,502

[22] Filed: Jun. 1, 1981

Related U.S. Application Data

[63] Continuation of Ser. No. 304, Jan. 2, 1979, abandoned.

[51] Int. Cl.³ .............................................. G06F 9/36
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,109,310 | 8/1978 | England et al. ...................... | 364/200 |
| 4,162,519 | 7/1979 | Hanewinkel ........................ | 364/200 |
| 4,179,738 | 12/1979 | Fairchild et al. .................... | 364/200 |
| 4,206,503 | 6/1980 | Woods et al. ....................... | 364/200 |
| 4,241,397 | 12/1980 | Strecker et al. ..................... | 364/200 |

*Primary Examiner*—Thomas M. Heckler
*Attorney, Agent, or Firm*—Nicholas Prasinos

[57] ABSTRACT

A paging apparatus for improved mapping of virtual addresses to real addresses, addressing physical devices coupled to various communication buses, and controlling flow of data. By means of an eight-bit addressing apparatus activated for certain instructions which normally can address only 256 locations, an additional 512 locations can typically be addressed by generating control signals to modify a virtual address into a real address capable of addressing the additional locations. Additionally, the apparatus can control flow of data by enabling or disabling data control apparatus.

13 Claims, 10 Drawing Figures

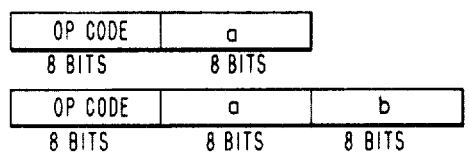
FIG. 1B
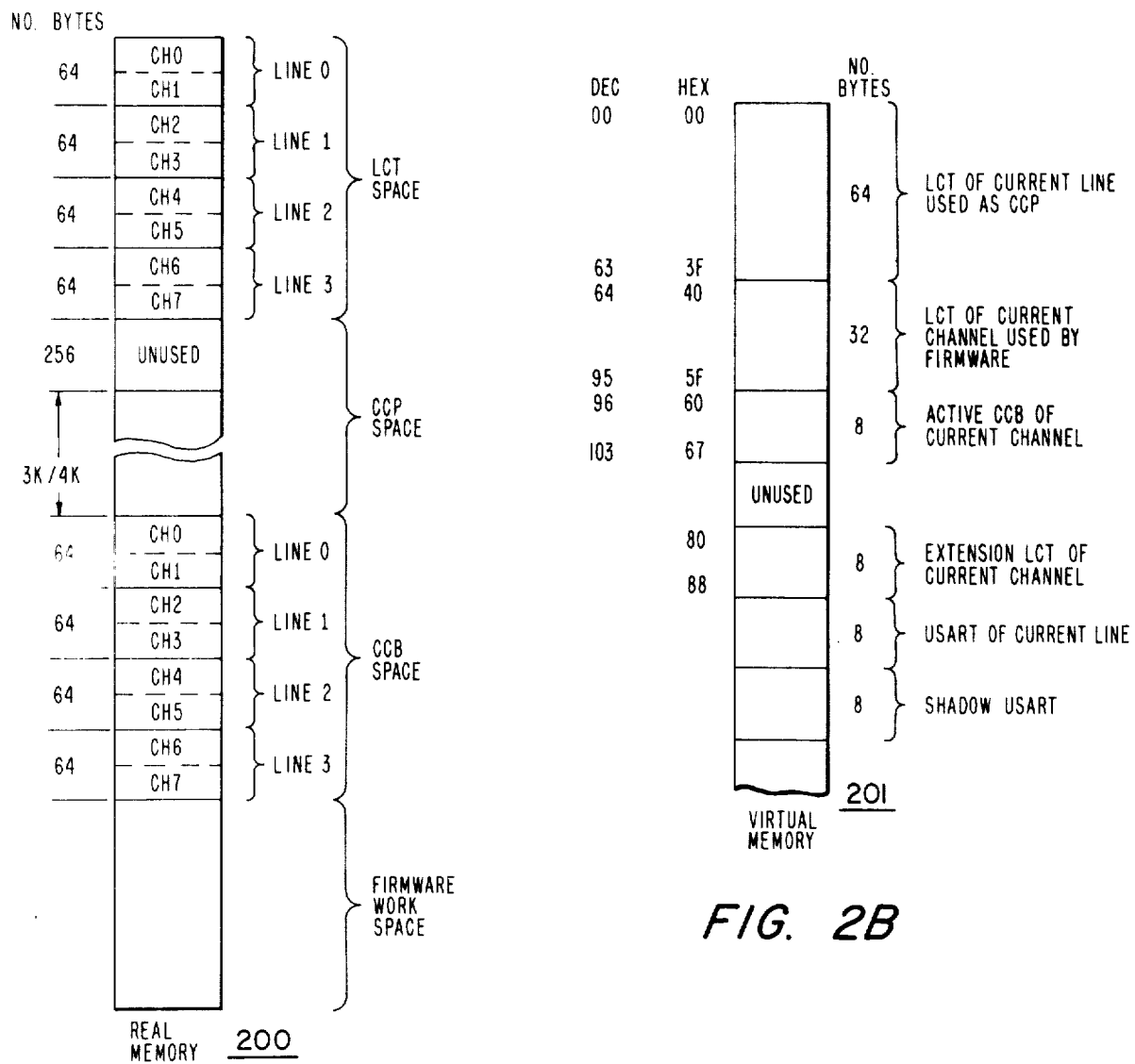
FIG. 2A
FIG. 2B

| PAGING PROM MAP |||||||||||
|---|---|---|---|---|---|---|---|---|---|---|
| VIRTUAL ADDRESS HEX. | PROM ADDRESS | PROM DEC. LOC. | HEX MAP AT LOC. | BINARY MAP AT LOC. |||||||
| | | | | 7 | 6 | 5 | 4 | 3 | 2 | 1 | 0 |
| 0000-7 | 140 | 0 | 7F | 0 | 1 | 1 | 1 | 1 | 1 | 1 | 1 |
| 8-F | 150 | 1 | 7F | 0 | 1 | 1 | 1 | 1 | 1 | 1 | 1 |
| 10-17 | 160 | 2 | 7F | 0 | 1 | 1 | 1 | 1 | 1 | 1 | 1 |
| 18-19 | 170 | 3 | 7F | 0 | 1 | 1 | 1 | 1 | 1 | 1 | 1 |
| 20 | 180 | 4 | 7F | 0 | 1 | 1 | 1 | 1 | 1 | 1 | 1 |
| 28 | 190 | 5 | 7F | 0 | 1 | 1 | 1 | 1 | 1 | 1 | 1 |
| 30 | 200 | 6 | 7F | 0 | 1 | 1 | 1 | 1 | 1 | 1 | 1 |
| 38 | 210 | 7 | 7F | 0 | 1 | 1 | 1 | 1 | 1 | 1 | 1 |
| 40 | 220 | 8 | 3F | 0 | 0 | 1 | 1 | 1 | 1 | 1 | 1 |
| 48 | 230 | 9 | 3F | 0 | 0 | 1 | 1 | 1 | 1 | 1 | 1 |
| 50 | 240 | 10 | 3F | 0 | 0 | 1 | 1 | 1 | 1 | 1 | 1 |
| 58 | 250 | 11 | 3F | 0 | 0 | 1 | 1 | 1 | 1 | 1 | 1 |
| 60 | 260 | 12 | 0F | 0 | 0 | 0 | 0 | 1 | 1 | 1 | 1 |
| 68 | 270 | 13 | FF | 1 | 1 | 1 | 1 | 1 | 1 | 1 | 1 |
| 70 | 280 | 14 | FF | 1 | 1 | 1 | 1 | 1 | 1 | 1 | 1 |
| 78 | 290 | 15 | FF | 1 | 1 | 1 | 1 | 1 | 1 | 1 | 1 |
| 80 | 300 | 16 | 2E | 0 | 0 | 1 | 0 | 1 | 1 | 1 | 0 |
| 88 | 310 | 17 | 66 | 0 | 1 | 1 | 0 | 0 | 1 | 1 | 0 |
| 90 | 320 | 18 | 6C | 0 | 1 | 1 | 0 | 1 | 1 | 0 | 0 |
| 98 | 330 | 19 | FF | 1 | 1 | 1 | 1 | 1 | 1 | 1 | 1 |
| A0 | 340 | 20 | EA | 1 | 1 | 1 | 0 | 1 | 0 | 1 | 0 |
| A8 | 350 | 21 | EC | 1 | 1 | 1 | 0 | 1 | 1 | 0 | 0 |
| B0 | 360 | 22 | EC | 1 | 1 | 1 | 0 | 1 | 1 | 0 | 0 |
| B8 | 370 | 23 | FF | 1 | 1 | 1 | 1 | 1 | 1 | 1 | 1 |
| C0 | 380 | 24 | EA | 1 | 1 | 1 | 0 | 1 | 0 | 1 | 0 |
| C8 | 390 | 25 | 6E | 0 | 1 | 1 | 0 | 1 | 1 | 1 | 0 |
| D0 | 400 | 26 | 6E | 0 | 1 | 1 | 0 | 1 | 1 | 1 | 0 |
| D8 | 410 | 27 | FF | 1 | 1 | 1 | 1 | 1 | 1 | 1 | 1 |
| E0 | 420 | 28 | EA | 1 | 1 | 1 | 0 | 1 | 0 | 1 | 0 |
| E8 | 430 | 29 | FF | 1 | 1 | 1 | 1 | 1 | 1 | 1 | 1 |
| F0 | 440 | 30 | FF | 1 | 1 | 1 | 1 | 1 | 1 | 1 | 1 |
| F8 | 450 | 31 | EE | 1 | 1 | 1 | 0 | 1 | 1 | 1 | 0 |

FIG. 1C

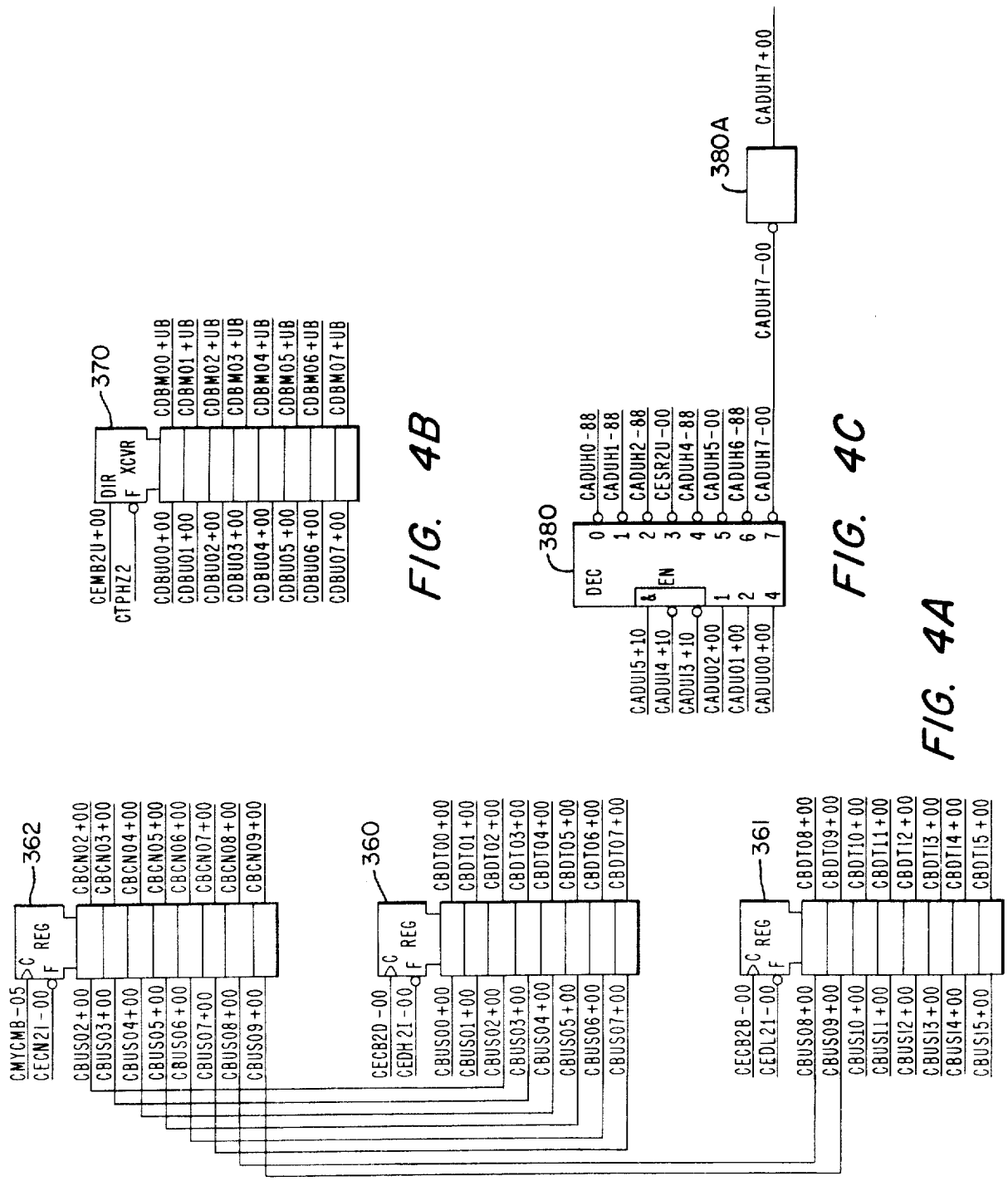

HARDWARE FOR EXTENDING MICROPROCESSOR ADDRESSING CAPABILITY

This is a division of application Ser. No. 000,304, filed Jan. 2, 1979, abandoned.

RELATED APPLICATIONS

The following U.S. patent applications filed on an even date with the instant application and assigned to the same assignee as the instant application are related to the instant application.

1. "I/O Priority Resolver" by Thomas O. Holtey, and having U.S. Ser. No. 000,477, now U.S. Pat. No. 4,271,467.
2. "Paging Mechanism" by Thomas O. Holtey, Robert C. Miller and Kin C. Yu, and having U.S. Ser. No. 000,463, now U.S. Pat. No. 4,290,104.
3. "Hardware for Remote Maintenance of Computer Systems" by Thomas O. Holtey and Kin C. Yu, and having U.S. Ser. No. 000,314, now U.S. Pat. No. 4,257,101.
4. "Multi-Way Vectored Interrupt Capability" by Thomas O. Holtey and Kin C. Yu, and having U.S. Ser. No. 000,402, now U.S. Pat. No. 4,255,786.
5. "I/O Request Interrupt Mechanism" by Thomas O. Holtey, and having U.S. Ser. No. 000,315, now U.S. Pat. No. 4,291,371.

BACKGROUND OF THE INVENTION

1. Field of the Invention

The invention relates to data processing systems and more particularly to addressing apparatus utilizing an improved paging mechanism.

2. Description of the Prior Art

Normally, a computer memory stores both operands and computer commands or instructions. Operands are generally data which are to be operated upon, and commands are instructions which collectively form a computer program. An instruction word normally includes a command portion which addresses a location in the computer memory. The number of locations in memory which can be addressed by a given instruction via binary notation depends on the number of bits allocated to the address portion of the instruction word and the hardware responsive to those bits. Normally, instruction words are comprised of eight-bit bytes, although any other number of bits may be utilized in a byte. Also it is not uncommon for the address portion of an instruction to include one, two, three or more bytes. An address portion of an instruction having only one eight-bit byte can only address $2^8$, or 256 locations in memory whereas an address portion having two, eight-bit bytes can address $2^{16}$, or 66,336 locations. Although more memory locations can be addressed with two eight-bit bytes, more time, and a greater number of cycles are necessary in fetching each address word from memory. Furthermore, more memory space is necessary in storing the larger words. With the trend toward minicomputers and microprocessors, computer memory and throughput is at a premium. Accordingly, what is required for minicomputers, microprocessors and communication processors, is an improved addressing mechanism which will permit greater addressing capability with a minimum of computer cycle time in fetching the address portion of an instruction.

The prior art is replete with memory addressing devices which have been designed to improve the addressing of computer main memories. A typical computer main memory addressing mechanism is shown in U.S. Pat. No. 3,267,462. This is a straightforward addressing mechanism with the ability to address any desired number of characters beginning with any randomly selected position.

Instructions stored in main memory, are generally stored in contiguous locations in groups so that the group comprises a computer program. Accordingly, it is generally not necessary to fetch another address to locate the second instruction and so on, because the original address can be modified by adding the number one (or some other number) to the address already fetched to acquire the next contiguous location to be fetched.

Other modification techniques comprise index-registers which are addressed by the original address and either replace or modify the original address to give a new address for the operand to be fetched. A typical device of this type is disclosed by H. Trauboth in U.S. Pat. No. 3,284,778 issued Nov. 8, 1966.

Further refinements to the computer addressing techniques led to relative addressing wherein the address portion of an instruction does not refer to the absolute memory address desired but to some address relative to a page or segment located in main memory. Accordingly, hardware can concatenate the relative address within a segment or page with the location of the beginning of that segment or page within main memory to locate the absolute address. Typical of this type of apparatus is the U.S. Pat. No. 3,938,096 to James L. Brown, et al issued Feb. 10, 1976, and U.S. Pat. No. 3,461,433 issued to W. C. Emerson on Aug. 12, 1969.

Still other addressing schemes increase speed and throughput by making use of a high-speed, small capacity memory to the main memory, and to which addresses are fetched prior to their use by the addressing mechanism. Hence speed in addressing is attained. Typical of this type device is that disclosed by Yohan Chu in U.S. Pat. No. 3,251,041 issued May 10, 1966.

To increase main memory capacity, a virtual memory system was devised wherein the operating system, such as that used in the IBM System 370, maps addresses resident on magnetic disk on to main memory. The user addresses main memory and the appearance to the user is that he has a vast capacity of main memory. (See Computer Organization and the System/370 by Harry Katzan Jr., published in 1971 by Van Nostrand Reinhold Company of New York). This is some of the prior art relating to memory addressing schemes of which the applicants are aware. It is presented as background information and no implication should be drawn that this is the closest prior art to the invention or that a search has been made.

All these schemes have generally been directed to large computer systems and generally require additional hardware such as index registers, buffer-memories. Moreover, memory space is not as much at a premium for large computers as with small computers.

What is required of the small computer is an improved address modification system which uses the hardware of the basic addressing mechanism and at the same time minimizes cycle time for accessing multiple address words.

OBJECTS OF THE INVENTION

It is a primary object of the invention to provide an improved computer main memory addressing mechanism.

It is another object of the invention to provide an improved computer memory addressing mechanism having improved address modification.

It is still another object of the invention to provide an improved computer memory addressing mechanism which requires a minimum space for storage of addresses.

It is still another object of the invention to provide an improved computer memory addressing mechanism which requires a minimum of addressing cycles.

It is still a further object of the invention to provide improved mapping of virtual addresses to real addresses.

SUMMARY OF THE INVENTION

The foregoing objects are achieved according to one embodiment of the invention by providing addressing hardware for addressing various physical devices coupled to various communication bases, for mapping of virtual addresses to real addresses, and controlling flow of data.

Five bits of an eight-bit address are utilized to address a paging signal generator to generate eight control signals. These eight control signals are utilized to modify the eight-bit address (which can normally address only 256 locations in main memory) to provide additional addressing capability. When the control signal is active for a particular bit, that bit is modified or another bit is substituted. When the control signal is not active, the original bit in the address is used.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

FIG. 1B is a schematic diagram of typical addressing formats of the invention.

FIG. 1C is a map of the paging PROM.

FIG. 2A is a schematic diagram of a typical organization of the real memory of the invention.

FIG. 2B is a schematic diagram of a typical organization of the virtual memory of the invention.

FIGS. 3 and 4–4C are logic block diagrams of the preferred embodiment of the invention.

DETAILED DESCRIPTION OF THE INVENTION

Figure 1A:
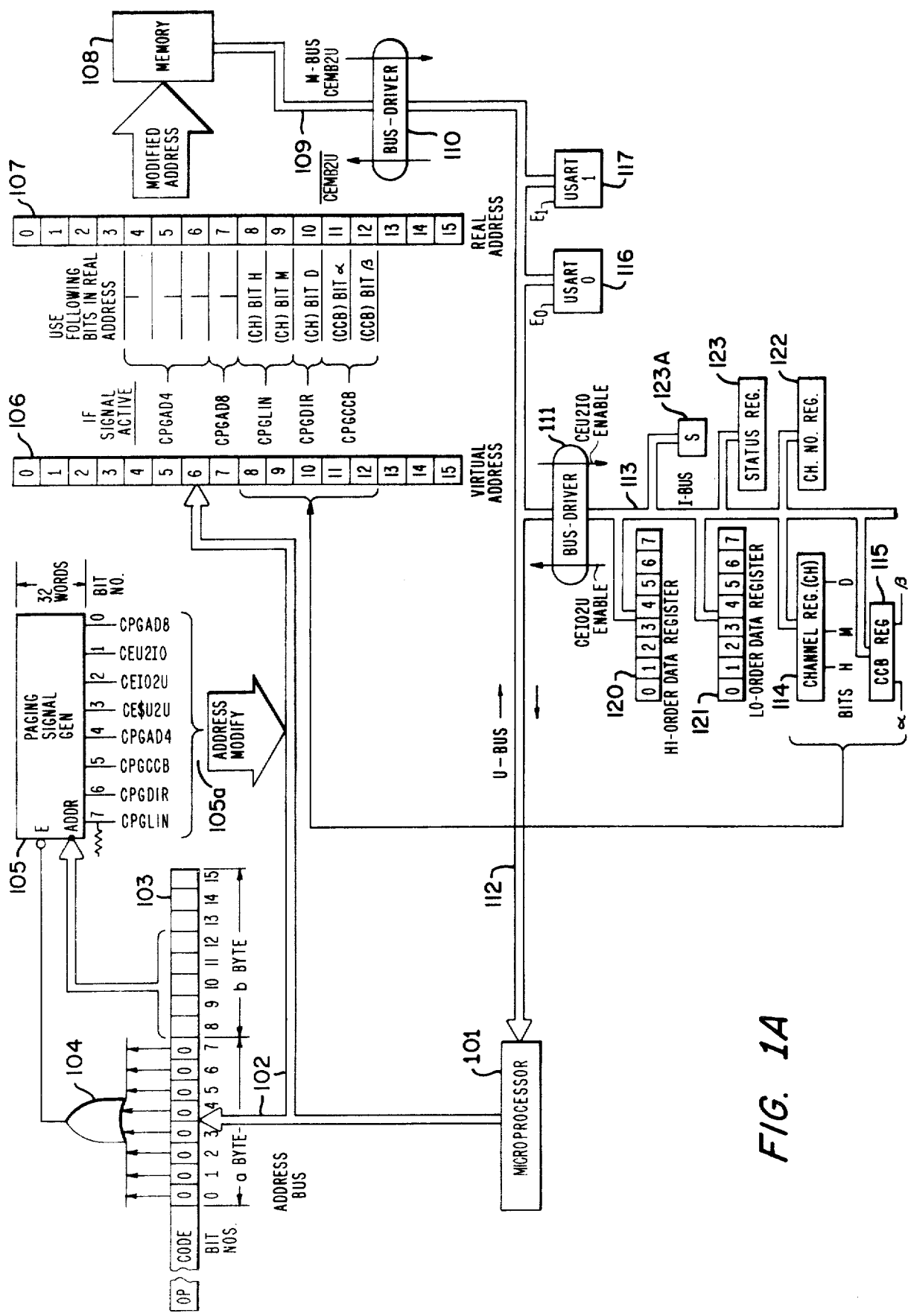
FIG. 1A is a schematic block diagram of the preferred embodiment of the invention.

Referring to FIG. 1A, there is shown a logic block diagram of a preferred embodiment of the invention which also shows information flow and modification of the information for improved addressing. A microprocessor 101 is typically a type 6800 commercially available from Motorola Inc. and uses a 16 bit address bus 102 to address main memory 108. (The 6800 is described in "The Complete Motorola Microcomputer Data Library", Series A, Motorola Inc. 1978 by Motorola Semiconductor Products, Box 20912, Phoenix, Arizona). This provides an addressing capability of over 64,000 bytes of main memory 108. The formats of the instruction are shown on FIG. 1B. There are primarily two formats: one having an eight bit op code and an 8 bit (a) byte whereas the other one has an 8 bit op code, and 8 bit (a) byte and an 8 bit (b) byte. In order to conserve space and cycle time, it is more advantageous to use only the (b) byte. Accordingly, in the schematic representation of FIG. 1A, the register 103 uses the first 5 high order bits 8, 9, 10, 11, and 12 to address the paging signal generator 105. (The paging signal generator is an integrated circuit memory chip of the type designated as 5610 and commercially available from Intersil Inc. The 5610 is describeed in the "Intersil Semiconductor Products Catalog" by Intersil Inc., 10900 North Tantau Avenue, Cupertino, California, published October, 1974).

The paging signal generator 105 stores 32 words which can be addressed by bits 8–12 of the (b) byte. Since 5 bits are used to address the paging signal generator, those bits can be used to address any of the 32 words therein. The internal circuitry of the generator 105 is such that when the first 8 words (up to address 07) are addressed, signal CPGLIN is activated (i.e., goes low). When the next four words of the signal generator 105 are addressed (i.e., addresses 8–11) then both signals CPGLIN and CPGDIR are activated. When the next location word 13 (i.e., address 12) is addressed, then all of the following signals are activated (i.e., go low):, CPGLIN, CPGDIR, CPGCCB and CPGAD4.

The paging signal generator 105 is enabled when a low output signal from the microprocessor 101 is present at its E input terminal. A low input signal is provided to the E input terminal of paging signal generator 105 from the output of OR gate 104 when all of its input bits 1–8 of (a) byte are 0 or low. These bits 1–8 of (a) byte are made 0 when it is desired to modify the 16 bit address provided by the (a) and (b) byte. Accordingly, when all the bits of the (a) byte are 0, a low signal results at the output of OR gate 104 which is applied to the E input terminal of paging signal generator 105 thus enabling it. When the paging signal generator 105 is enabled, one of the control signal locations 105a is addressed by bits 8–12 of (b) byte. When selected ones of these control signals 105a are active (i.e. low), the 16 bit virtual address 106 is modified to the real address 107 which then addresses main memory 108. If none of the control signals 105a are active, then the 16 bit address 106 is identical to the 16 bit address 107 and no modification occurs for addressing memory 108. (The mechanism for performing this modification will be discussed in detail in relation to FIG. 3.)

Assuming, therefore, that control signal CPGCCB is active, then bit 11 of the virtual address is replaced by the bit in position α of CCB register 115 and bit 12 will be replaced by bit β in CCB register 115 to form the real address. If control signal CPGDIR is active, then bit 10 of the virtual address is replaced by bit D of channel register 114. If control signal CPGLIN is active, then bit 9 of the virtual address is replaced by bit M of the CH register 114, and bit 8 of the virtual address is replaced by bit H of the CH register 114. If control signal CPGAD8 is active, then bit 7 of virtual address is replaced by a one. Finally, if control signal CPGAD4 is active, then bits 4, 5, and 6 of the virtual address are replaced by a one.

The CE$U2U control signal, generated by the paging signal generator 105, is used to address the line number of a selected Universal Synchronous Asynchronous Receiver Transmitter (USART) 116, 117. (USART's are commercially available from Intel Corporation and are of the programmable Communication Interface type 8251A. The 8251A is described in the "Intel Component Data Catalog 1978" published by Intel Corporation, 3065 Bowers Avenue, Santa Clara, Calif. The CEIO2U control signal enables the I-bus 113 via bidirectional bus driver 111. (These bidirectional bus drivers are commercially available from Texas Instrument and are designated as type 74LS245. The 74LS245 is described in "The TTL Data Book for Design Engineers", Second Edition, copyright 1976 by Texas Instrument.) The CEIO2U signal permits communication from the I-bus 113 to the U-bus 112, whereas a CEU2IO signal permits communication from the U-bus 112 to the I-bus 113. The I-bus may have various registers attached for storing communications information. Some typical registers are the HI-Order Data Register 120, LO-Order Data Register 121, channel no register 122, and status register 123. These registers communicate with the microprocessor via the I-bus 113 and the U-bus 112, and with main memory 108 via I-bus 113 and M-bus 109.

In order for the various registers on the I-bus 113 to communicate with main memory 108 and microprocessor 101, it is necessary to assign space in main memory for various lines and channels associated with any communication port. Referring therefore to FIG. 2A, it will be seen that real memory 200 has a portion of its area reserved for lines 0–3. Each line is comprised of 64 bytes and the total 4 lines 0–3 comprise the Logical Table (LCT) space. Each line 0–3 is furthermore subdivided into 2 channels of 32 bytes each. Accordingly, there are 8 channels of 32 bytes comprising 4 lines of 64 bytes, each which comprises the LCT space. The next 256 bytes are reserved for Channel Command Programs (CCP) use. There are also 3 to 4K bytes which together with the unused space are reserved for Channel Command Programs (CCP). Below this space there is an additional 256 bytes reserved for the Channel Control Block (CCB). As with the LCT space, each line 0–3 is associated with one CCB of 64 bytes, each of which is subdivided into 2 channels of 32 bytes each. Below this is memory space reserved as firmware work space. Accordingly, it can be seen that each line 0–3 is associated with one LCT space and one CCB space, each of which is subdivided into two channels.

Part of the addressing mechanism described supra with FIG. 1A addresses all of these memory spaces. However, to do this it takes two address bytes a and b, since one address byte is comprised of 8 bits and 8 bits can address only 256 locations. Yet as can be seen from FIG. 2A, there are 768 locations (3×256) excluding the 3K/4K locations. There 256 locations are the most commonly addressed since communication of lines 0–3 must constantly be had with its LCT's, its CCB's and the firmware. It is very inefficient to utilize the 16 bit address which can normally address over 64,000 locations merely to address 768 locations, yet only one 8 bit address can address only 256 locations. This invention permits the 768 locations to be addressed by the first 5 bits 8–12 of the (b) byte 103 by permitting the modification of the virtual address of FIG. 2B as discussed supra. Hence cycle time and storage space are saved by this short form of addressing.

Referring to FIG. 1C, there is shown the map of the paging signal generator 105 (i.e., Paging PROM 300).

The map is self-explanatory. The address locations are shown in various numbering systems on the first 3 columns, whereas the last column contains the actual information stored at that address location. The fourth column designates the hexadecimal locations which have similar contents.

Referring to FIG. 2B, there are shown 256 locations in memory 201 reserved for virtual memory. The first 64 locations or bytes are numbered in decimal notation 0 through 63 and in hexadecimal notation 0 through 3F, and comprise the LCT of the current line used by the CCP. The next 32 locations or bytes, decimal locations 64–95 and in hexadecimal notation 40–5F, are reserved for the LCT of the current channel used by firmware. The next 8 locations or bytes denoted in decimal notation 96–103 and in hexadecimal notation 60–67 are reserved for the active CCB of the current channel. There is then an unused space and there are 3 eight byte locations reserved for the USART of the current line, the shadow USART of the current line respectively and the extension of LCT of the current channel.

A typical example will illustrate how the improved addressing scheme of the invention works. Assume, therefore, that location 5 of line 0 of virtual memory 201 is to be addressed. Accordingly, all of the bits 0 through 7 of (a) byte of register 103 would be 0 which would enable OR gate 104 and enable the paging signal generator 105. The next 5, bits 8 through 12, would also be 0, whereas bit 13 would be a 1, bit 14 would be 0 and bit 15 would be a one thus giving the binary address 101 or decimal 5. The virtual address 106 would also have bits 0 through 12 equal to 0 with bit 13 being 1, bit 14 being 0 and bit 15 being 1. Additionally, however, since bits 8–12 of the (b) byte in register 103 are 0, control signal CPGLIN would be active. (It was seen supra that if bits 8–12 were utilized to address the first 8 words in the paging signal generator 105, signal CPGLIN would be active or low). With signal CPGLIN active, bits 8 and 9 of the virtual address 106 would be replaced by bits H and M respectively of channel register 114. Under our assumption, which initially was that we are addressing location 5 of line 0, bits H and M of channel register 114 would be 0 and accordingly bits 8 and 9 of real address 107 would also be 0. Thus the final real address would have bits 0–12 equal to 0, bit 13 would be a 1, bit 14 would be a 0, and bit 15 would be a 1, thus addressing the fifth location of line 0 of real memory.

To take this problem one step further, assume now that the fifth location in line 1 is now to be addressed. The bit contents of register 103 and virtual address 106 would be identical as in the prior example. However, since line 1 is now being addressed the channel register 114 would have a 0 in its high order bit H and a 1 in its next order bit M. Accordingly, when signal CPGLIN is activated once again (since bits 8–12 of the (b) byte of register 103 are all zeroes), bit 8 of virtual address 106 would be replaced by bit H of channel register 114 which is a 0. Bit number 9 of virtual address 106 would be replaced by the mid bit M of channel register 114 which in this example is a 1, since line 1 is being addressed. Hence the real address 107 would have zeroes in bit positions 0 through 8, bit 9 would be a 1, bits 10–12 would remain 0, and bit 13 would still be a 1, bit 14 would still be 0, and bit 15 would still be a 1. Accordingly, now hexadecimal location 45 is addressed in real memory which is the fifth location of line 1. It can readily be seen by this reasoning that at location 5, line 2 or line 3, could be similarly addressed merely by substituting bits H and M of the channel register 114 for bits 8 and 9 of the virtual address 106 to obtain the real address 107.

Figure 3:
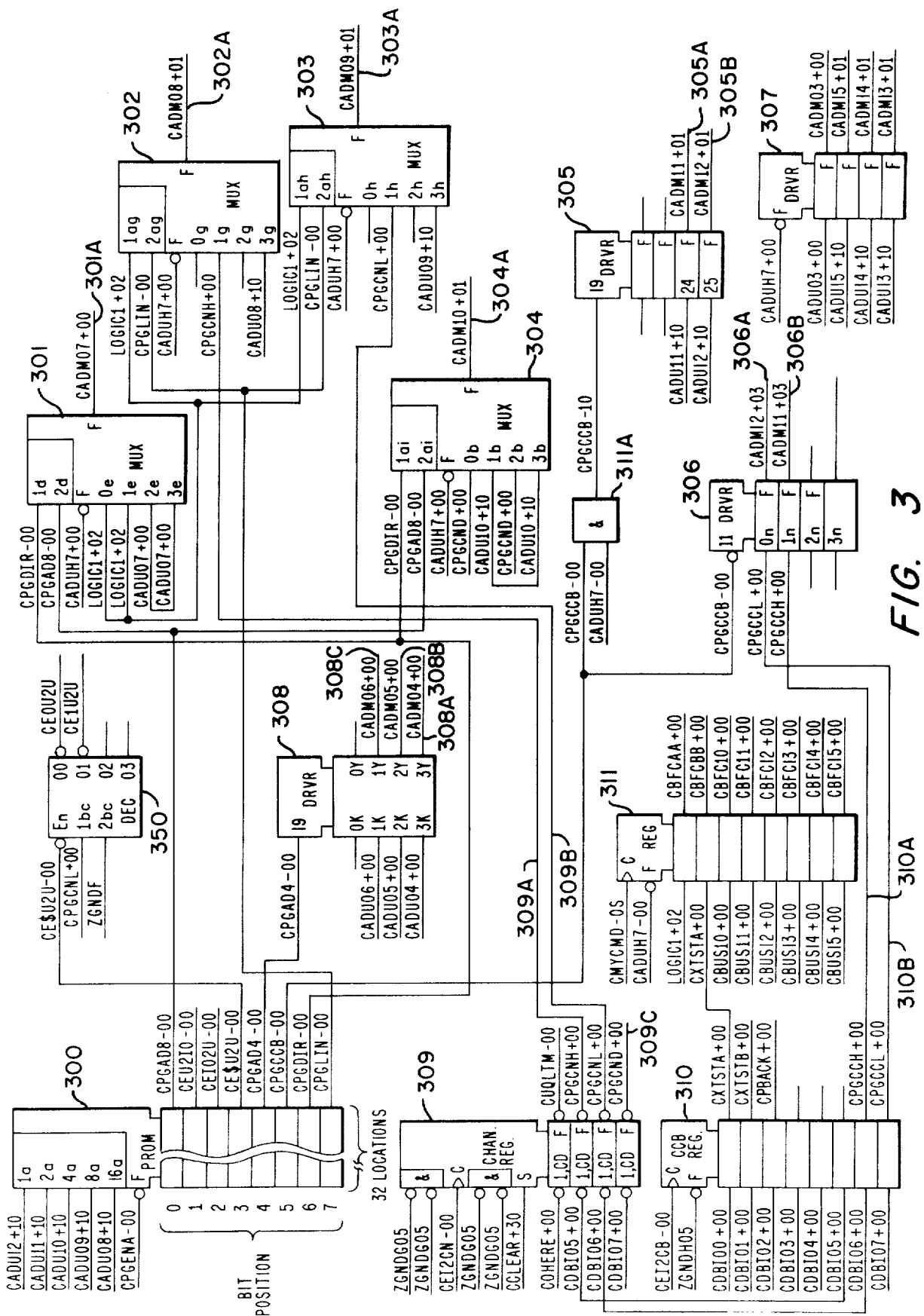

Referring to FIG. 3, there is shown the detailed logic block diagram of the paging apparatus for improved mapping of virtual addresses to real addresses. First, a structural decription will be given wherein the various structures of FIG. 3 will be identified and tied into FIG. 1A where feasible; second, the operation of the structure of FIG. 3 will be described to show how the various functions are performed. It should be noted from FIG. 1A supra that the paging mechanism is designed to modify bits 4 through 12 of virtual address format 106 to provide the final real address 107 with bits 4 through 12 either modified or not in accordance with the signals presented. On FIG. 3 it should be noted that multiplexers (MUX) 302, 303, and 304 and driver 305 provide the output signals respectively on lines 302A, 303A, 304A, 305A and 305B which represent modified bits 8 through 12 of the real address 107. Multiplexer (MUX) 301 and driver 308 provide the output signals on line 301A, 308A, 308B, and 308C which represent bits 4 through 7 of the modified real address 107. Register 309 corresponds to register 114 of FIG. 1A and stores bits H, M and D and provides these bits as output signals on lines 309A, 309B and 309C. Register 310 corresponds to CCB register 115 on FIG. 1A and stores and provides the α and β bits as signal output on lines 310A and 310B respectively. PROM 300 corresponds to paging signal generator 105. As described supra, it provides the various signals for mapping the virtual address 106 into the real address 107. The map of PROM 300 corresponds to FIG. 1C. Drivers 305 and 306 are coupled with AND gate 311A to provide the real memory address bits 11 and 12. Register 311 is utilized to store various signals.

Each of these devices is commercially available from such manufacturers as Texas Instrument, Motorola, Intel and other semiconductor manufacturers in accordance to their universal designations as shown in Table I below:

TABLE I

| Type of Device and Numeral Designation | Commercial Identification Number |
| --- | --- |
| MUX301, 302, 303 and 304 | 74LS253 |
| Drivers 305, 306, 307 and 308 | 74LS241 |
| Registers 309 and 114 | 74173 |
| Registers 310 and 311 | 74LS374 |
| AND gate 311 | 74LS08 |
| PROM 300 | 5610 |

The 74 series circuits are listed in "The TTL Data Book for Design Engineers", Second Edition, copyright 1976 by Texas Instrument. The 5610 is listed in the "Intersil Semiconductor Products Catalog", published in 1974 by Intersil, Inc.

Referring once again to FIG. 3, the operation and function of the paging apparatus for improved mapping of virtual addresses to real addresses will be described in greater detail. As has been discussed supra with respect to FIG. 1A, when addresses 0 through 7 of PROM chip 300 are addressed, the communication paging line signal (CPGLIN) becomes active by going low. This is shown on the paging PROM Map of FIG. 1C, wherein the contents of the map in the first 8 positions are 01111111. Bit position 7 is 0, or low, which activates signal CPGLIN. This signal is then applied to input terminal 2ag and 2ah of multiplexers (MUX) 302 and 303 respectively. The other input control signal to input terminals 1ag and 1ah of multiplexers 302 and 303 respectively is the logic 1 (LOGIC1) signal which is wired to always be high. When signal CPGLIN is active (i.e., in the low state), it addresses input terminals 1ag and 1ah of multiplexers 302 and 303 respectively which means that the signals on input terminals 1g and 1h will pass through as outputs on lines 302A and 303A respectively. By following the signals (CPGCNH) on input terminal 1g of multiplexer 302 back to its source, it will be observed that it comes from the high order bit on line 309A of channel register 309. Similarly, following the input signal (CPGCNL) on input terminal 1h of MUX 303 back to its source shows that it comes from the middle order output line 309B. These correspond to bits H and M of channel register 114 of FIG. 1A. Accordingly, when the line paging signal (CPGLIN) is activated, the H and M bit of register 114, 309 is substituted for virtual address bits 8 and 9 on output lines 302A and 303A respectively.

Conversely, when the line paging signal (CPGLIN) is not activated (i.e., high), then the address bits 8 and 9 of the virtual address are not modified and are passed as is to the output lines 302A and 303A of MUX's 302 and 303 respectively. This occurs because when CPGLIN is high input and with LOGIC1 always being high, addresses 3g and 3h are addressed on MUX's 302 and 303 respectively. Input address 3g of MUX 302 is CADU08 which is interpreted as the communication address of the microprocessor bit 8. Input address 3h of MUX 303 is CADU09 which is interpreted as the communication address on the microprocessor bit 9. When input terminals 3g and 3h are addressed, this become active and permits the addresses on that terminal to pass through to the output lines of 302A and 303A of MUX's 302 and 303.

The next control bit for modifying the virtual address 106 from the PROM chip 300 is the directional bit (CPGDIR). The directional bit is the low order bit D in channel register 114 and on line 309C of channel register 309. The directional bit becomes activated when addresses 8, 9, 10 and 11 (decimal) of the PROM 300 are addressed (See FIG. 1C). Additionally, when these bits 8-11 are addressed output signal CPGLIN also becomes active. Accordingly, in addition to the application of the CPGLIN signal to MUX's 302 and 303, there is an application of signal CPGDIR on input terminals 1d and 1ai of MUX's 301 and 304 respectively. With signal CPGDIR on input terminal 1ai of MUX 304 low, it makes no difference whether input signal CPGAD8 on input terminal 2ai of MUX 304 is high or low, since under either condition either input terminal 0b or 2b (addresses 00 or 10 binary) are activated and the CPGCND signal is applied to both these addresses. The origin of the CPGCND signal is from the output line 309C of channel register 309 which is the D bit of channel register 114 and channel register 309. Accordingly, when the directional bit CPGDIR is activated, the number 10 (decimal) bit of virtual address 106 is modified in accordance to the contents of the D bit of the channel register 114 or 309.

There is no effect of the CPGDIR signal on the 1d input terminal of MUX 301 unless CPGAD8 signal is also activated. This is true because with signal CPGAD8 inactivated or high, only addresses 2e or 3e (10 or 11 binary) of MUX 301 can be addressed. They are both the same and represent bit 7 of the communication address of the microprocessor. However, when the CPGAD8 signal from PROM 300 is also activated (i.e., low), then only address 0e or 1e (00 or 01 binary) of MUX 301 is addressed and becomes active; both these addresses have the logic signal 1 LOGIC1 applied which is permitted to pass to output line 301A of MUX 301 when both signals CPGAD8 and CPGDIR are active or only when CPGAD8 is active.

Hence with CPGAD8 active, bit 7 of virtual address is modified and forced to a one.

As described supra with respect to FIG. 1A, when the channel register bit (CPGCCB) is active or low, then bits 11 and 12 of virtual address 106 are replaced by channel bits α and β of register 115. Since register 310 on FIG. 3 corresponds to channel register 115, and bit CPGCCH on output line 310A corresponds, to the α bit of channel register 115, and bit CPGCCL on output line 310B corresponds to the B bit of register 115, then these bits will replace bits 11 and 12 of the virtual address when the signal CPGCCB is active or low.

Thus, when the signal CPGCCB is activated, it is applied to the 11 input terminal of driver 306 and to the 1 terminal of AND gate 311A. Accordingly, driver 306 is enabled and the channel control bit signals CPGCCH and CPGCCL on output lines 310A and 310B are applied to terminals 1n and 0n respectively of driver 306. They pass through to output lines 306A and 306B of driver 306 and replace bits 11 and 12 of the virtual memory address. It should be noted that when the CPGCCB signal applied to input terminal 1 of driver 306 is low, it enables driver 306; but this same signal applied to the input terminal 19 of driver 305 disables driver 305. Hence the CADU11 and CADU12 signals on input terminals 24 and 25 respectively of driver 305 are not passed through to the output terminal 305A and 305B of driver 305, but rather are replaced by channel register 310 bits as previously described. Accordingly, it is seen that either driver 306 or 305 is enabled but not both, and either the channel register bits are passed through via driver 306 or the microprocessor address bits are passed through to the output via driver 305.

Finally, with respect to the virtual address modification, the modification of bits 4, 5 and 6 will be discussed. As noted supra with respect to FIG. 1A, this is accomplished via signal CPGAD4. When address 12 (decimal) of paging signal generator, 105 is addressed, all of the following signals become active: CPGLIN, CPGDIR, CPGCCB and CPGAD4. This is seen by referring to FIG. 1C where address 12 (decimal) contains the following 00001111. Hence bit positions 4, 5, 6 and 7 are low or active, and from FIG. 1A, ref. numeral 105, these correspond to signals CPGAD4, CPCGCCB, CPCDIR and CPGLIN respectively.

It has already been shown how the first three signals modify the virtual address when they are active, and it will now be shown how the signal CPGAD4 modifies the virtual address and forces one's into bits 4, 5 and 6 of the virtual address. The CPGAD4 signal is applied to the enabling terminal 19 of driver 308. When driver 308 is not enabled (i.e., low), then one's are forced for bits 4, 5 and 6 respectively. If it is enabled (i.e., high), and then the microprocessor address CADU 4, 5 and 6 respectively will pass through. The reason for this is that driver 308 is a commercially available LS241 tri-state circuit which has pull up resistors for the signal applied. Accordingly, if a low signal such as CPGAD4 is applied, it does not enable driver 308 and the output signals are pulled up to +5 volts making it a logic 1. On the other hand, when CPGAD4 is not active it is high, thus it enables driver 308 and permits the address signal on input terminals 1k, 2k, and 3k respectively of driver 308.

Not only does the paging signal generator 105 on FIG. 1A and its equivalent PROM 300 on FIG. 3 generate signals that can more efficiently address memory 108 but it further generates signals which provide more efficient addressing and communication between main memory 108, the microprocessor 101 and various registers and perpherals attached to the I-bus and U-bus. This communication between various devices such as register to register, memory to register, utilizing the U-bus and the I-bus is initiated by activating signal CEU2IO (i.e., signal CEU2IO is low and represented on FIG. 1C by a zero). It should be noted that signal CEU2IO is bit position number 1 on paging signal generator 105.

Now referring to FIG. 1C, which is the map of paging signal generator 105 and its equivalent PROM 300 it should be noted that there are 3 addresses where there is a zero stored at bit position number 1. They are decimal locations 18, 21 and 22 or virtual address hexadecimal locations 90, A8 and B0. Accordingly, when any of these locations of paging signal generator 105 or PROM 300 are addressed by the microprocessor 101, signal CEU2IO will become active or low. Signal CEU2IO initiates the communication process and controls the enabling of the bus driver 111 on FIG. 1A. It is also applied as one input to AND gate 354 of FIG. 4 and gurantees a pulse out after after the data becomes valid on the bus.

Figure 4:
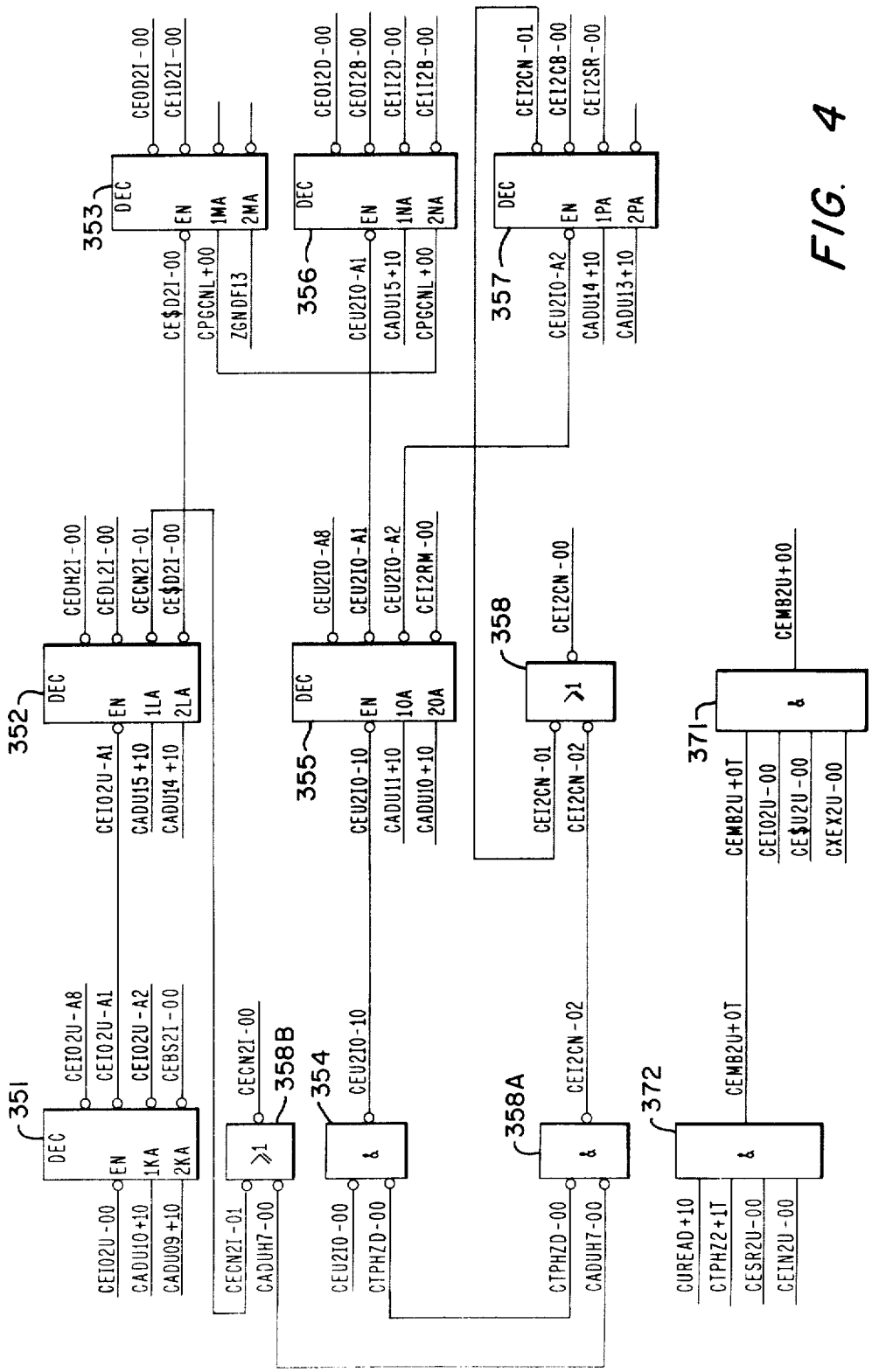

Referring to FIGS. 3 and 4. A signal CEU2IO is generated at bit position 1 of PROM 300 when it is desired to enable the I-bus driver 311A to cause data to be driven from the U-bus to the I-bus and written into either the channel register 114, the CCB register 115 or the S register 123A. Referring to FIG. 4 it will be noted that the signal CEU2IO is applied to one input terminal of AND gate 354 and is AND'ed with a strobe signal CTPHZD to generate the CEU2IO-10 signal at the output of AND gate 354. This signal is then applied to the enabling input of decoder 355. Also applied to input terminals 20A and 10A respectively of decoder 355 are bits 10 and 11 of the address 103 of the communication address unit. These bits are then decoded so as to activate one of four signals on the output terminals of decoder 355. When bits 10 and 11 on the input terminals 20 and 10 of decoder 355 are 1 and 0 respectively or decimal 2, then the output signal CEU2IO-A2 is enabled and is applied to the enable terminal of decoder 357.

Additionally, bits 13 and 14 of the communication address unit (i.e., signals CADUI3 and CADUI4) are applied to input terminals 2PA and 1PA respectively of decoder 357. When both these bits 13 and 14 are 0, the zero output terminal of decoder 357 is enabled. Singal CEI2CN is activated through a NOR gate 358 and used to write into channel register 114 on FIG. 1A and channel register 309 on FIG. 3. On the other hand, if bits 13 and 14 are 0 and 1 respectively and are applied as signals CADU13 and CADUI4 to input terminals 2PA and 1PA respectively of decoder 357 then the 01 output terminal of decoder 357 is enabled and signal CEI2CB becomes active and is utilized to address CCB register 115 on FIG. 1A and CCB register 310 on FIG. 3. Finally, if bits 13 and 14 applied as signals CADU13 and CADU14 on input terminals 2PA and 1PA respectively of decoder 357 are 1 and 0 or decimal 2 then the 02 output terminal of decoder 357 becomes enabled and signal CEI2SR becomes active and is utilized to address the S register 123A. Thus signal CEU2IO is utilized to enable the bus driver 111 and address registers 114, 115 and 123A. Accordingly, when the microprocessor 101 executes a write instruction directing it to write the microprocessor's accumulator into location A8 hexadecimal, the microprocessor places the contents of the microprocessor's accumulator on the U-bus and enables bus driver 111 in a write direction which is then strobed into the appropriate register address.

When a write instruction is being executed and information is being written into any of the registers on the I-bus, bus driver 110 on FIG. 1A also enables the M-bus 109 and the same information written into the address register is also written into a section of memory 108 which is addressed. (See also FIGS. 2A and 2B.) Bus driver 110 is enabled by the lack of signal CEMB2U and enables the M-bus in the direction of the memory 108. Hence the information written into the registers is also written into a "shadow memory" which preserves the information for diagnostic purposes or for debugging and provides a place to preserve data when remote maintenance is performed.

In reading data from the I-bus to the U-bus it is necessary to inhibit transfers of data from the M-bus to the U-bus. This allows the I-bus to control the data onto the U-bus. This function is performed by generating the signal CEIO2U in paging signal generator 105. This signal is then applied to the enable terminal of decoder 351 on FIG. 4, and at the same time bits 9 and 10 of the address 103 are applied to input terminals 2KA and 1KA respectively as signals CADU09 and CADU10. These signals undergo a first level of decode to provide an output signal CEIO2U-A1 on output terminal 01 of decoder 351 when the input bits 9 and 10 are 0 and 1 respectively. The CEIO2U-A1 signal is then applied to the enable input terminal of decoder 352 along with bits 14 and 15 on input terminals 2LA and 1LA respectively.

Depending on the binary value of bits 14 and 15, 1 of 4 subcommand signals will be generated at the output terminals of encoder 352. When bits 14 and 15 have 0 values (which is equivalent to addressing location hexadecimal A8 in virtual memory space), a subcommand CEDH2I-00 is generated at the 00 output terminal of decoder 352. That signal is then applied to the enable terminal of register 360. Register 360 corresponds to the HI-order data register 120 of FIG. 1A. Accordingly, signal CEIO2U provides a means for reading data from the high order register 120 into the I-bus and onto the U-bus. However, since bus driver 110 has been inhibited by the presence of signal CEM2U, the memory space addressed by the address 103 is not read and only the high order register 120 is read. In a similar manner, low order data register 121 is read when bits 14 and 15 are enabled respectively, thus addressing output terminal 01 (the second output terminal) of decoder 352. Hence the signal CEDL2I-00 is generated which is applied to the enable terminal of register 361 on FIG. 4A. Thus it is seen that registers 360 and 361 of FIG. 4A correspond to registers 120 and 121 respectively of FIG. 1A.

Bus driver 110 of FIG. 1A corresponds to driver 370 of FIG. 4B. This is a bidirectional driver and can drive data either from the memory bus 109 to the U-bus 112 or vice versa. The direction of data transfer is controlled by the signal CEMB2U. When the signal is asserted, data is permitted to flow from the memory bus 109 to the microprocessor bus 112. When it is not asserted it permits data transfers in the other direction. The CEMB2U signal is generated via AND gates 371 and 372 of FIG. 4. These AND gates represent a simple AND'ing operation of various signals such as the microprocessor CUREAD, the strobe signal CTPHZ2 and communication enable signals CESR2U and CEIN2U. They generate the CEMB2U signal which is then applied to one input terminal of AND gate 371. It should be noted when a transfer operation from the I-bus to the U-bus is being made. In other words, a read operation from a register on the I bus to the U bus then that signal would be high on the input of AND gate 371; and if the remaining signals are also high, the CEMB2U signal is high. When this high signal is applied to the input terminal of driver 370 of FIG. 4B it would inhibit information passing through via bus driver 110 from the I-bus to the M-bus.

Having shown and described a preferred embodiment of the invention, those skilled in the art will realize that many variations and modifications may be made to effect the described invention and still be within the scope of the claimed invention. Thus, many of the elements indicated above may be altered or replaced by different elements which will provide the same result and fall within the spirit of the claimed invention. It is the intention therefore, to limit the invention only as indicated by scope of the claims.

What is claimed is:

1. In a computer system having at least one microprocessor, a plurality of address modification registers, and a memory having memory locations addressed by real addresses, said memory containing instruction words executable by said microprocessor, some of said instruction words being short type instruction words having shorter address fields than others of said instruction words and being capable of addressing a first number of said memory locations which is less than the total number of locations in said memory, an apparatus for extending the addressing capability of said short type instruction words comprising:

(a) means for detecting whether an instruction word currently being executed by said microprocessor is a short type instruction word;

(b) signal generating means activated by said detecting means and when said detecting means indicates that said instruction word currently being executed is a short type instruction word, said signal generating means generating a predetermined number of control signals; and (c) first means coupled to said signal generating means and to said address modification registers, said first means responding to said control signals and to data stored in said address modification registers to convert said address fields of said short type instructions being executed by said microprocessor into real addresses for addressing said memory locations in said memory, the number of real addresses which can be formed by said first means being greater than said first number of memory locations.

2. The apparatus as recited in claim 1 wherein said signal generating means includes a programmable read only memory (PROM).

3. The apparatus as recited in claim 1 including a universal synchronous asynchronous receiver transmitter (USART) and further including second means coupled to said first means and to said control signals for using said real address to address said USART and said memory simultaneously.

4. In a computer system having at least one microprocessor, a plurality of address modification registers containing address modification data, and a memory addressed by real addresses, said memory containing instruction words executable by said microprocessor, some of said instruction words being short type instruction words having shorter address fields than others of said instructions, said short type instruction words being capable of addressing a first number of said memory locations which is less than the total number of locations in said memory, an apparatus for extending the addressing capability of said short type instruction words comprising:
(a) gating means for enabling the exchange of address modification data between said address modification registers and said microprocessor;
(b) means for detecting whether an instruction word currently being executed by said microprocessor is a short type instruction word;
(c) signal generating means activated by said detecting means when said detecting means indicates that said currently-executed instruction word is a short type instruction word, said signal generating means generating a predetermined number of control signals; and
(d) first means coupled to said signal generating means and to said address modification registers, said first means responding to said control signals and to said address modification data to convert said address fields of said short type instructions being executed by said microprocessor into real addresses for addressing said memory locations in said memory, the number of real addresses which can be formed by said first means being greater than said first number of locations in said memory.

5. The apparatus as recited in claim 4 wherein said signal generating means is a programmable read only memory (PROM).

6. The apparatus as recited in claim 5 wherein said gating means includes a bus-driver.

7. The apparatus recited in claim 4 including a universal synchronous asynchronous receiver transmitter (USART) and further including second means coupled to said first means and to said control signals for using said real addresses to address said USART and said memory simultaneously.

8. In a computer system having a microprocessor, a plurality of address modification registers, and a memory having memory locations addressed by real addresses, said memory containing instruction words executable by said microprocessor, some of said instruction words being short type instruction words having address fields shorter than others of said instruction words and being capable of addressing a first number of said memory locations which is less than the total number of locations in said memory, a method for extending the addressing capability of said short type instruction words comprising the steps of:
(a) forming real addresses by modifying said address fields of said instruction words only when said microprocessor is executing said short type instruction words, the number of locations which can be accessed by said real addresses being greater than said first number of locations; and
(b) using said real addresses to access locations in said memory.

9. The method of claim 8 wherein the step of forming said real addresses includes the steps of:
(a) generating control signals when said microprocessor is executing short type instruction words;
(b) using said control signals to form certain bits of said real addresses; and
(c) using the bits of said address fields as the bits of said real addresses which were not formed by said control signals.

10. The method of claim 9 wherein the step of generating signals includes the steps of:
(a) activating a signal generating means when said microprocessor is executing said short type instructions; and
(b) generating said signals from said signal generating means based upon certain bits in said address field.

11. The method of claim 10 wherein the step of using said signals to form certain bits of said real address includes the steps of:
(a) using said control signals to place the contents of certain of said address modification registers into certain bits of said real address, and
(b) using said signals to place constant data into certain other bits of said real address.

12. In a computer system having a microprocessor, a plurality of address modification registers, a universal asynchronous receiver transmitter (USART) for exchanging data with said microprocessor, and a memory having memory locations addressed by real addresses, said memory containing instruction words executable by said microprocessor, some of said instructions being short type instruction words having address fields shorter than others of said instruction words and being capable of addressing a first number of said memory locations which is less than the total number of locations in said memory, a method for extending the addressing capability of said short type instruction words comprising the steps of:
(a) forming real addresses by modifying said address fields of said instructions only when said microprocessor is executing said short type instruction words, the number of real addresses which can be formed being greater than said first number of locations; and
(b) using said real addresses to address locations in said memory and to address said USART simultaneously, and thereby to store in said memory the data exchanged with said USART.

13. The method of claim 12 wherein the step of forming said real addresses includes the steps of:
(a) activating a signal generating means when said microprocessor is executing said short type instruction words;
(b) generating control signals from said signal generating means based upon certain bits in the address fields of said short type instruction words;
(c) using said control signals to place the contents of certain of said address modification registers into certain bits of said real addresses;
(d) using said control signals to place constant data into certain other bits of said real addresses; and
(e) using the bits of said address fields of said short type instruction words to form those bits of said real addresses into which data were not placed by said control signals.

* * * * *